United States Patent
Soukharev et al.

(10) Patent No.: US 11,184,148 B2
(45) Date of Patent: Nov. 23, 2021

(54) ELLIPTIC CURVE CRYPTOGRAPHY SCHEME FOR EDWARDS CURVES HAVING A DIFFERENTIAL SIDE-CHANNEL ATTACK COUNTERMEASURE

(71) Applicant: INFOSEC GLOBAL INC., Toronto (CA)

(72) Inventors: Vladimir Soukharev, Toronto (CA); Basil Hess, Zurich (CH)

(73) Assignee: INFOSEC GLOBAL INC., Toronto (CA)

( * ) Notice: Subject to any disclaimer, the term of this patent is extended or adjusted under 35 U.S.C. 154(b) by 154 days.

(21) Appl. No.: 16/540,151

(22) Filed: Aug. 14, 2019

(65) Prior Publication Data

US 2020/0044818 A1 Feb. 6, 2020

Related U.S. Application Data

(63) Continuation of application No. PCT/CA2017/050233, filed on Feb. 23, 2017.

(51) Int. Cl.
*H04L 29/06* (2006.01)
*H04L 9/00* (2006.01)
*H04L 9/30* (2006.01)

(52) U.S. Cl.
CPC ............ *H04L 9/003* (2013.01); *H04L 9/3066* (2013.01)

(58) Field of Classification Search
CPC . H04L 9/003; H04L 9/3066; H04L 2209/046; G09C 1/00
See application file for complete search history.

(56) References Cited

U.S. PATENT DOCUMENTS

| | | | | |
|---|---|---|---|---|
| 5,606,617 A | * | 2/1997 | Brands | H04L 9/3263 380/30 |
| 9,485,092 B2 | * | 11/2016 | Smets | G06Q 20/102 |
| 9,825,758 B2 | * | 11/2017 | Feng | H04L 9/30 |
| 2019/0215154 A1 | * | 7/2019 | Simplicio, Jr. | H04L 9/3066 |

OTHER PUBLICATIONS

Same Value Analysis on Edwards Curves|Abarzua et al. Jul. 21, 2015 | pp. 1-20| https://eprint.iacr.org/2015/731.pdf (Year: 2015).*
To Infinity and Beyond: Combined Attack on ECC Using Points of Low Order|Fan et al.|2011|pp. 143-159| https://www.esat.kuleuven.be/cosic/publications/article-2049.pdf (Year: 2011).*

* cited by examiner

*Primary Examiner* — Mahfuzur Rahman
(74) *Attorney, Agent, or Firm* — Bhole IP Law; Anil Bhole; Marc Lampert

(57) ABSTRACT

A system, method and elliptic curve cryptography scheme using an Edwards-form elliptic curve. The elliptic curve cryptography scheme having a blinding protocol resistant to differential side channel attacks. The elliptic curve defined over field F and having a point P with coordinates located on the elliptic curve. The blinding protocol including: randomly selecting a random element I; and determining coordinates of a blinded point $P_B$ by performing a multiplication of a random element I by at least one of the coordinates of point P.

20 Claims, 13 Drawing Sheets

ELLIPTIC CURVE CRYPTOGRAPHY SCHEME FOR EDWARDS CURVES HAVING A DIFFERENTIAL SIDE-CHANNEL ATTACK COUNTERMEASURE

TECHNICAL FIELD

The following relates to data communication systems and cryptographic schemes utilized in such systems; and more specifically, to a differential side-channel attack countermeasure for elliptic curve cryptography having an Edwards-form elliptic curve.

BACKGROUND

Elliptic curve-based cryptographic ("ECC") schemes generally use cryptographic approaches that have been heavily scrutinized to avoid attacks on the scheme itself. However, there exist other types of attacks that target a physical implementation of a cryptosystem, emissions of the implementation, or the like. These types of attacks are generally referred to as side-channel attacks ("SCA"). In some cases, side-channels can include power consumption, timing, and emissions such as radio frequency ("RF"), sound, or the like.

In general, SCAs can be either simple side-channel attacks ("Simple SCA" or "SSCA") or differential side-channel attacks ("Differential SCA" or "DSCA").

Simple SCAs can typically obtain information about the system from observed operations, usually single observed operations. In the case of ECC, such single operation can be a single scalar multiplication (i.e., the operation d·P). The security of ECC schemes is based on the hardness of the elliptic curve discrete logarithm problem ("ECDLP"); for a point P (of order n) on the elliptic curve and a random secret value $d \in \{1, \ldots, n-1\}$, it is hard to derive the discrete logarithm d from Q=d·P. Simple SCA typically exploit timing or power consumption characteristics of the scalar multiplication algorithm (for example, of the double-and-add scalar multiplication approach) that depend on the secret scalar d.

Generally, differential SCAs are attempted if the attacker cannot derive sufficient information from a simple SCA. Differential SCAs typically can be attempted if side-channel information of operations, with the same secret scalar element and different group elements (for example, elliptic curve points) are available. Exploits typically employ statistical analysis to derive information about the secret scalar d. Differential SCA may also be known as Differential Power Analysis Attacks ("DPA attacks").

However, conventional approaches to countermeasures to DSCA are typically not sufficiently optimized or efficient, and as such, detriment the performance of a system employing the ECC.

It is therefore an object of the present invention to provide an elliptic curve cryptography scheme in which the above disadvantages are obviated or mitigated and attainment of the desirable attributes is facilitated.

SUMMARY

In an aspect, there is provided an elliptic curve cryptography scheme using a blinding protocol resistant to differential side channel attacks, elliptic curve cryptography scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the elliptic curve comprising an Edwards curve, the elliptic curve defined over field F and having a point P with coordinates located on the elliptic curve, the blinding protocol comprising: randomly selecting a random element I; determining coordinates of a blinded point $P_B$ by performing a multiplication of random element I by at least one of the coordinates of point P; and providing coordinates of blinded point $P_B$.

In a particular case, point P is a generator point of the elliptic curve.

In another case, a new random element I is selected every time the blinding protocol is performed.

In yet another case, the point P is in affine coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I.

In yet another case, the point P is in homogenous projective coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I multiplied by the z-coordinate of the point P.

In yet another case, the point P is in affine coordinates, and the x-coordinate of blinded point $P_B$ is determined to be the random element I multiplied by the y-coordinate of the point P, the y-coordinate of blinded point $P_B$ is determined to be the random element I multiplied by the x-coordinate of the point P, and the z-coordinate of blinded point $P_B$ is determined to be the random element I multiplied by the x-coordinate of the point P and the y-coordinate of the point P.

In yet another case, the point P is in homogenous projective coordinates, and the x-coordinate of blinded point $P_B$ is determined to be the random element I multiplied by the y-coordinate of the point P and the z-coordinate of the point P, the y-coordinate of blinded point $P_B$ is determined to be the random element I multiplied by the x-coordinate of the point P and the z-coordinate of the point P, and the z-coordinate of blinded point $P_B$ is determined to be the random element I multiplied by the x-coordinate of the point P and the y-coordinate of the point P.

In yet another case, the point P is in affine coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I, and the t-coordinate of blinded point $P_B$ is determined to be the random element I multiplied by the x-coordinate of the point P and the y-coordinate of the point P.

In yet another case, the point P is in homogenous projective coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I multiplied by the x-coordinate of the point P and the y-coordinate of the point P, and the t-coordinate of blinded point $P_B$ is determined to be the random element I multiplied by the x-coordinate of the point P and the y-coordinate of the point P.

In another aspect, there is provided a method for applying a differential side-channel attack countermeasure in elliptic curve cryptography to permit secure communications between two or more cryptographic correspondent devices, each of the cryptographic correspondent devices comprising a processor and a memory, the memory configured to store a plurality of instructions which when executed by the processor cause the processor to implement the method, the elliptic curve being an Edwards curve, the elliptic curve defined over field F and having a point P with coordinates located on the elliptic curve, the method comprising: randomly selecting a random element I; and determining coordinates of a blinded point $P_B$ by performing a multiplication of random element I by at least one of the coordinates of point P.

In a particular case, the point P is in affine coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I.

In another case, the point P is in homogenous projective coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I multiplied by the z-coordinate of the point P.

In yet another case, the point P is in affine coordinates, and the x-coordinate of blinded point $P_B$ is determined to be the random element I multiplied by the y-coordinate of the point P, the y-coordinate of blinded point $P_B$ is determined to be the random element I multiplied by the x-coordinate of the point P, and the z-coordinate of blinded point $P_B$ is determined to be the random element I multiplied by the x-coordinate of the point P and the y-coordinate of the point P.

In yet another case, the point P is in homogenous projective coordinates, and the x-coordinate of blinded point $P_B$ is determined to be the random element I multiplied by the y-coordinate of the point P and the z-coordinate of the point P, the y-coordinate of blinded point $P_B$ is determined to be the random element I multiplied by the x-coordinate of the point P and the z-coordinate of the point P, and the z-coordinate of blinded point $P_B$ is determined to be the random element I multiplied by the x-coordinate of the point P and the y-coordinate of the point P.

In yet another case, the point P is in affine coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I, and the t-coordinate of blinded point $P_B$ is determined to be the random element I multiplied by the x-coordinate of the point P and the y-coordinate of the point P.

In yet another case, the point P is in homogenous projective coordinates, and the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I multiplied by the x-coordinate of the point P and the y-coordinate of the point P, and the t-coordinate of blinded point $P_B$ is determined to be the random element I multiplied by the x-coordinate of the point P and the y-coordinate of the point P.

In another aspect, there is provided a system for implementing an elliptic curve cryptography scheme on a correspondent device, the elliptic curve cryptography scheme having a blinding protocol resistant to differential side channel attacks, the correspondent device in secure communication with one or more other correspondent devices, the correspondent device comprising a processor and a memory, the memory configured to store a plurality of instructions which when executed by the processor cause the processor to implement the elliptic curve cryptography scheme, the elliptic curve being an Edwards curve, the elliptic curve defined over field F and having a point P with coordinates located on the elliptic curve, the system comprising: a random selection module for randomly selecting a random element I; and a coordinate determination module for determining coordinates of a blinded point $P_B$ by performing a multiplication of random element I by at least one of the coordinates of point P.

In a particular case, the point P is in affine coordinates, and the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, and the z-coordinate of blinded point $P_B$ is determined by the coordinate determination module to be the random element I.

In another case, the point P is in homogenous projective coordinates, and the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, and the z-coordinate of blinded point $P_B$ is determined by the coordinate determination module to be the random element I multiplied by the z-coordinate of the point P.

In yet another case, the point P is in affine coordinates, and the x-coordinate of blinded point $P_B$ is determined by the coordinate determination module to be the random element I multiplied by the y-coordinate of the point P, the y-coordinate of blinded point $P_B$ is determined by the coordinate determination module to be the random element I multiplied by the x-coordinate of the point P, and the z-coordinate of blinded point $P_B$ is determined by the coordinate determination module to be the random element I multiplied by the x-coordinate of the point P and the y-coordinate of the point P.

In yet another case, the point P is in homogenous projective coordinates, and the x-coordinate of blinded point $P_B$ is determined by the coordinate determination module to be the random element I multiplied by the y-coordinate of the point P and the z-coordinate of the point P, the y-coordinate of blinded point $P_B$ is determined by the coordinate determination module to be the random element I multiplied by the x-coordinate of the point P and the z-coordinate of the point P, and the z-coordinate of blinded point $P_B$ is determined by the coordinate determination module to be the random element I multiplied by the x-coordinate of the point P and the y-coordinate of the point P.

In yet another case, the point P is in affine coordinates, and the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, the z-coordinate of blinded point $P_B$ is determined by the coordinate determination module to be the random element I, and the t-coordinate of blinded point $P_B$ is determined by the coordinate determination module to be the random element I multiplied by the x-coordinate of the point P and the y-coordinate of the point P.

In yet another case, the point P is in homogenous projective coordinates, and the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, the z-coordinate of blinded point $P_B$ is determined by the coordinate determination module to be the random element I multiplied by the x-coordinate of the point P and the y-coordinate of the point P, and the t-coordinate of blinded point $P_B$ is determined by the coordinate determination module to be the random element I multiplied by the x-coordinate of the point P and the y-coordinate of the point P.

DESCRIPTION OF THE DRAWINGS

An embodiment of the present invention will now be described by way of example only with reference to the accompanying drawings, in which.

DETAILED DESCRIPTION

Figure 1:
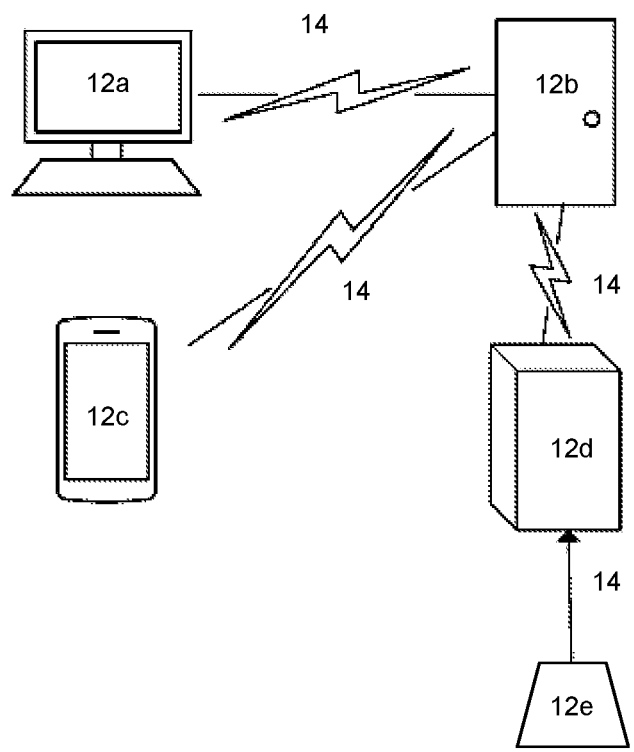
FIG. 1 is a schematic representation of a data communication system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to data communication systems and cryptographic schemes utilized in such systems; and more specifically, to differential side-channel countermeasures for elliptic curve cryptography having an Edwards-form elliptic curve.

In general, the approach of the present embodiments taken is to (i) convert affine coordinates to projective coordinates, (ii) compute the operation in projective coordinates, and (iii) convert the result from projective coordinates to affine coordinates. In an embodiment, this approach can be used to determine scalar multiplication, in ECC schemes, that include DSCA countermeasures.

Turning to FIG. 1, an embodiment of a data communication system 10 is shown. The data communication system 10 includes a plurality of correspondent devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Bluetooth™ or other conventional forms of communication.

Figure 2:
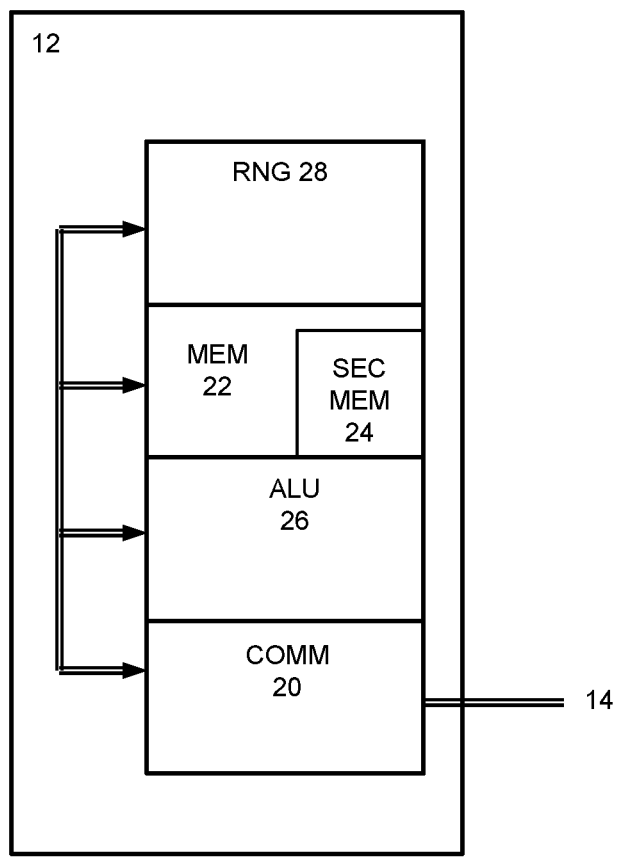
FIG. 2 is a representation of a device used in the data communication system of FIG. 1.

As shown in FIG. 2, the devices 12 will differ according to their intended purpose, but typically will include a communication module 20 for communication to the links 14. A memory 22 provides a storage medium for non-transient instructions to implement protocols and to store data as required. The instructions are executed by an arithmetic logic unit (ALU) 26 (or processing unit). A secure memory module 24, which may be part of memory 22 or may be a separate module, is used to store private information, such as the private keys used in the encryption protocols and withstand tampering with that data. The arithmetic logic unit (ALU) 26 (or processing unit) is provided to perform the arithmetic operations instruction by the memory 22 using data stored in the memories 22, 24. A random or pseudo random number generator 28 is also incorporated to generate bit strings representing random numbers in a cryptographically secure manner.

It will be appreciated that the device 12 illustrated in FIG. 2, is highly schematic and representative of a conventional device used in a data communication system.

The memory 22 stores system parameters for the ECC scheme to be implemented and a set of computer readable instructions to implement the ECC scheme. The parameters can be represented as bit strings, or any other suitable computer-readable representation.

Finite field arithmetic in $F_p$ includes operations that vary greatly in efficiency. Notably, modular inversion can be slower than the other operations by about two orders of magnitude. Conventional approaches tend to rely heavily on inversion operations if standard affine coordinates are used. In some cases, problems related to inversion operations can be alleviated by using transformations to other coordinate systems that reduce the quantity of inversions, but increase the number of modular multiplications. As described herein, Applicant has advantageously determined an approach that selects, for each ECC operation or step, one or more coordinate transformations that lead to coordinates with an optimal inversion-to-multiplication (I/M) ratio. In an example, candidates for coordinates are the following:

Affine coordinates;
Standard projective coordinates;
Jacobian projective coordinates;
Chudnovsky projective coordinates; and
Modified Jacobian coordinates.

In further cases, such as for the point addition operation in ECC, it is also possible to perform the operation in mixed coordinates. Hence, for further optimization, mixed coordinates will be considered.

In a representative example, let $E: y^2=x^3+ax+b$ be the equation of the elliptic curve. Coordinates of this curve can be represented in the following ways:

Affine coordinates: From a curve in Weierstrass form $y^2=x^3+Ax+B$, a point $P_1$ is represented with the $x_1$ and $y_1$ coordinates: $P_1=(x_1,y_1)$;
Standard projective coordinates: A projective point (X:Y:Z), $Z\neq 0$, corresponds to the affine point (X/Z,Y/Z);
Jacobian projective coordinates: A Jacobian point (X:Y:Z), $Z\neq 0$, corresponds to the affine point $(X/Z^2,Y/Z^3)$;
Chudnovsky projective coordinates: A Chudnovsky point $(X:Y:Z:Z^2:Z^3)$ corresponds to the Jacobian point (X:Y:Z), $Z\neq 0$; and
Modified Jacobian coordinates: A Jacobian point (X:Y:Z:$aZ^4$), $Z\neq 0$, corresponds to the affine point $(X/Z^2,Y/Z^3)$.

Figure 3:
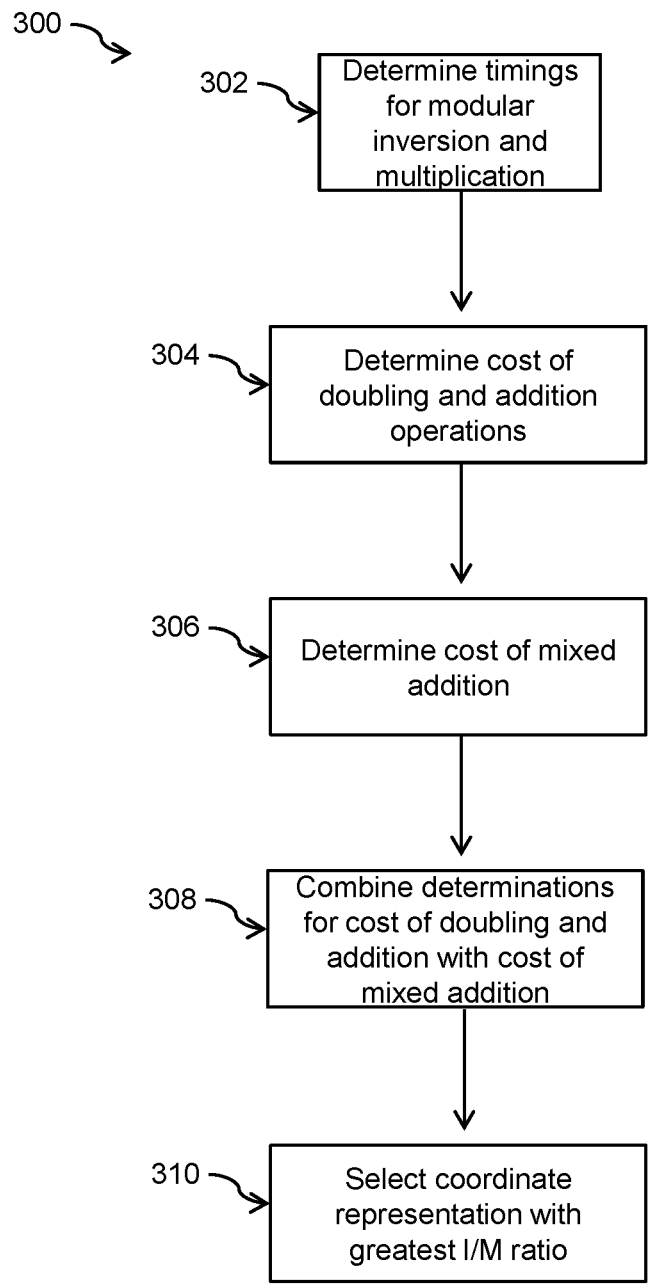
FIG. 3 is a flow chart showing a method for selecting coordinate transformations, according to an embodiment.

As shown in the flowchart of FIG. 3, there is provided a method for selecting coordinate transformations 300. At block 302, timings are determined for modular inversion and modular multiplication in $F_p$ for a target system. At block 304, for each coordinate representation, the cost of doubling and addition operations for elliptic curves is determined in terms of finite field operations. At block 306, the cost of addition operations for elliptic curves is determined in terms of finite field operations for mixed coordinate addition. At block 308, the determinations from block 304 and block 306 are combined. At block 310, the coordinate representation with the greatest I/M ratio is selected.

In implementations of ECC schemes, a common operation to perform scalar multiplication consists of a series of doublings and additions. The operations on elliptic curve points are doubling (P→2·P) and addition (P,Q→P+Q). Thus, an optimal coordinate representation should consider both of these two operations to evaluate and compare the results.

Field inversion is an expensive operation. For example, for some finite fields specified by the National Institute of Standards and Technology (NIST), implementations show that inversion cost is approximately equivalent to the cost of 80 multiplications. In some cases, this cost can be much larger; for example, in the range of 260 to 550, correlating to the bitsize of the field. Thus, in some cases, switching to other coordinate representations can save substantial computational cost.

Applicant has performed an analysis to determine which of the described approaches provides superior efficiency. In such analysis, "I" represents a field inversion operation, "M" represents a field multiplication operation, and "S" represents a field squaring operation. An example for one of the analysis is described below.

For example, for doubling using Jacobian projective coordinates: Let $P_1=(X_1,Y_1,Z_1)$, $P_2=(X_2,Y_2,Z_2)$ and $P_3=(X_3,Y_3,Z_3)=P_1+P_2$. The procedure to compute $P_3$ is as follows:

$U_1=X_1 \cdot Z_2^2$  Step 1.

$U_2=X_2 \cdot Z_1^2$  Step 2.

$S_1=Y_1 Z_2^3$  Step 3.

$S_2=Y_2 \cdot Z_1^3$  Step 4.

If $U_1=U_2$ and $S_1 \neq S_2$, return the identity point  Step 5.

$H=U_2-U_1$  Step 6.

$R=S_2-S_1$  Step 7.

$X_3=R^2-H^3-2U_1 \cdot H^2$  Step 8.

$Y_3=R \cdot (U_1 \cdot H^2-X_3)-S_1 \cdot H^3$  Step 9.

$Z_3=H \cdot Z_1 \cdot Z_2$  Step 10.

Return $P_3=(X_3,Y_3,Z_3)$  Step 11.

Next, the number of field operations is determined. Step 1 and 2, each take S+M. For step 3, there is already $Z_2^2$, hence only 2M is needed to compute it. Similarly, step 4 takes 2M. The next three steps are free. Step 8 needs S for $R^2$, S+M for $U_1 \cdot H^2$ and there is already $H^2$, only M for $H^3$ is needed, giving a total of 2S+2M. For step 9, since there is already $U_1 \cdot H^2$ and $H^3$, only 2M is needed. Finally, step 10 takes 2M. The total is 12M+4S.

This procedural analysis was completed by Applicant for the other various coordinate representations with respect to the cost of elliptic curve addition and doubling. Applicant's analysis can be summarized as follows:

Affine coordinates: Doubling=1I+2M+2S; Addition=1I+2M+1S.
Standard projective coordinates: Doubling=7M+5S; Addition=12M+2S.
Jacobian projective coordinates: Doubling=4M+6S; Addition=12M+4S.
Chudnovsky projective coordinates: Doubling=5M+6S; Addition=11M+3S.

Modified Jacobian coordinates: Doubling=4M+4S; Addition=13M+6S.

Applicant then analyzed the mixed coordinate addition. Let A stand for Affine, P for Standard projective, J for Jacobian projective, C for Chudnovsky projective, and L for Modified Jacobian. Applicant's analysis can be summarized as follows:

| Coordinates | Resulting Coordinates | Cost |
| --- | --- | --- |
| P + A | P | 9M + 2S |
| J + A | J | 8M + 3S |
| J + C | J | 11M + 3S |
| C + A | C | 8M + 3S |
| L + A | L | 9M + 5S |
| L + C | L | 12M + 5S |

Taking the fact that the number of point doublings and additions is approximately the same, optimization on the value of cost of doubling+addition is needed. The following gives the cost for various point representations:

| | Doubling | Addition | Total Cost |
| --- | --- | --- | --- |
| Affine coordinates | 1I + 2M + 2S | 1I + 2M + 1S | 2I + 4M + 3S |
| Standard projective coordinates | 7M + 5S | 12M + 2S | 19M + 7S |
| Jacobian projective coordinates | 4M + 6S | 12M + 4S | 16M + 10S |
| Chudnovsky projective coordinates | 5M + 6S | 11M + 3S | 16M + 9S |
| Modified Jacobian coordinates | 4M + 4S | 13M + 6S | 17M + 10S |

Next, combining the doubling and point addition in mixed coordinates is determined. Since one of the main computations will be scalar multiplications, it is important that whenever mixed addition is used, the result is in the coordinates in which the doubling is performed. Otherwise, extra conversions would be required between the points, which would make the approach inefficient. The costs can be summarized as follows:

| Coordinates | Resulting Coordinates | Cost of addition | Cost of doubling | Total Cost |
| --- | --- | --- | --- | --- |
| P + A | P | 9M + 2S | 7M + 5S | 16M + 7S |
| J + A | J | 8M + 3S | 4M + 6S | 12M + 9S |
| J + C | J | 11M + 3S | 4M + 6S | 15M + 9S |
| C + A | C | 8M + 3S | 5M + 6S | 13M + 9S |
| L + A | L | 9M + 5S | 4M + 4S | 13M + 9S |
| L + C | L | 12M + 5S | 4M + 4S | 16M + 9S |

Observing the results, it can be seen that in comparison to J+C, C+A, L+A, L+C, the approach of J+A is most efficient. Thus only P+A is left to compare. P+A requires four more multiplications, but two less squarings. Squaring is a special case of multiplication, hence has a complexity of no more than multiplication. Thus, Applicant determined that J+A, with doubling in Jacobian coordinates, to be most efficient.

The fact is that there is a cost of converting between the coordinate representations. Converting from affine to any of the representations is computationally free; however, converting to affine will typically require a field inversion for each coordinate (i.e. x and/or y). It may also require one field squaring; however, the cost of this is typically negligible in comparison to inversion. Point doubling or addition in affine coordinates involves one inversion. Hence, the computation can be accomplished by (i) affine to other coordinate representation, (ii) computation in other coordinate representation, then (iii) other coordinate representation to affine. To increase efficiency, the conversion to the other representation is required when the operation involves more than one addition and/or doubling operation for the case when only one coordinate is needed. Additionally, the conversion to the other representation is required when more than addition and/or doubling operations for the case when both coordinates of the point are needed. In practice, the latter will be most common due to the fact that the most common operation is scalar multiplication, which involves, approximately, the bitsize of the prime p quantity of addition/doubling operations.

Through analysis, Applicant has determined that generally the most optimal coordinate representation to use in ECC is Jacobian, with the point addition performed using mixed coordinates. In most cases in ECC, the affine coordinates of the original point will be available, and thus, mixed point addition will be applicable. The efficiency increases are especially prevalent for the scalar multiplication operation when using a double-and-add approach. For the addition portion of the approach, the original point is added to the current state of the point. The current state of the point will naturally be in Jacobian, and the original point in affine, thus obtaining a result in Jacobian. These facts make the double-and-add type algorithm run naturally, giving outputs in Jacobian.

Using the Applicant's determination of using Jacobian with mixed coordinates, the computations cost savings can be substantial. For a non-optimized version, scalar multiplication takes about 3t/2+2 doublings/additions; where t is the bitsize of the prime. In affine coordinates, each step involves one inversion, but takes about seven fewer multiplications than a Jacobian approach. At the end, two inversions are performed using the Jacobian. Hence, this approach saves approximately 3t/2·(I−7M). Due to the fact that I>>7M, the savings can be substantial.

Generally, differential side-channel attack countermeasures, in ECC, against differential side-channel attacks aim to disguise the scalar multiplication operation such that statistical analysis cannot be used to derive information about the secret scalar d.

In the embodiments described herein, a masking or blinding approach is provided to address the threat of DSCA. In some cases, countermeasures to particularly address the threat of DPA attacks. For example, DPA attacks, without countermeasures, may allow an adversary to derive the secret scalar of the ECC from the computation of d·P, even if there are countermeasures against SSCA. In some cases, a DSCA can employ statistical analysis of multiple operations involving the secret scalar to derive the secret scalar. Accordingly, the embodiments described herein can advantageously provide an effective countermeasure against attempts to extract the secret scalar d·P by an adversary with DSCA.

Figure 4:
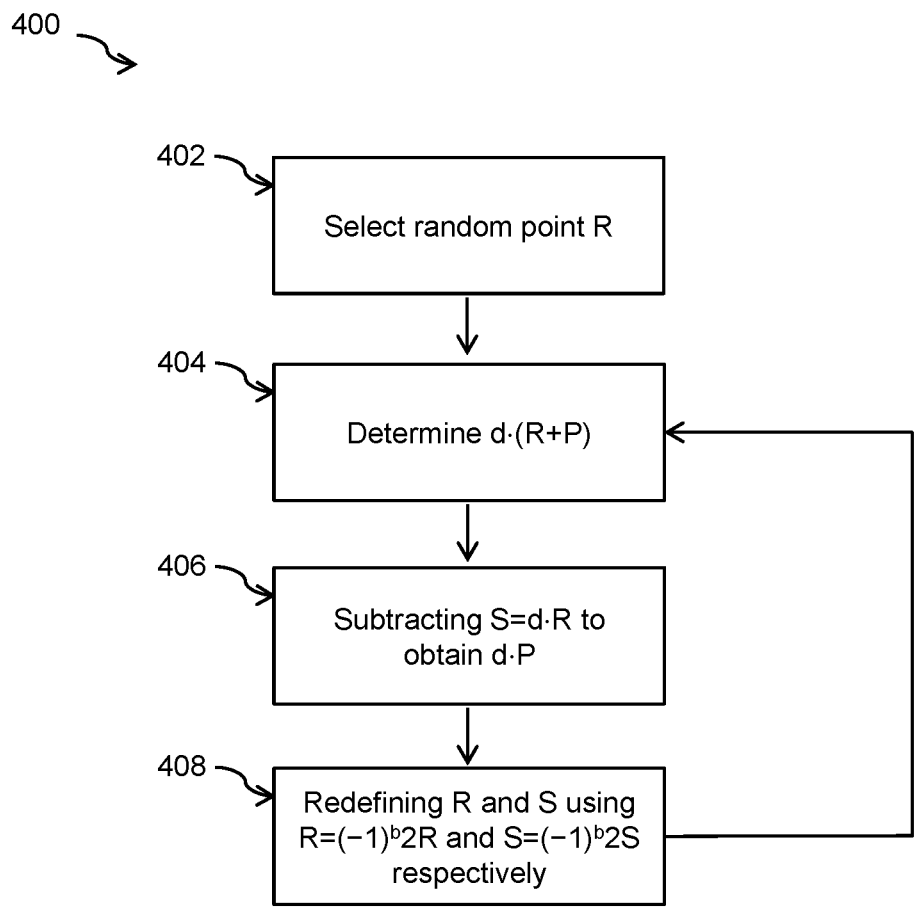
FIG. 4 is a flow chart showing a method for adding randomness to a scalar multiplication in elliptic curve cryptography ("ECC"), according to an embodiment.

In an embodiment for a DSCA countermeasure in an ECC scheme, randomness can be added by way of masking or blinding a point P involved in the scalar multiplication d·P. In a particular case, a secret random point R can be added to P. As shown in FIG. 4, there is provided a method 400 for adding randomness to a scalar multiplication in ECC. At block 402, a random point R on the elliptic curve is selected. At block 404, d·(R+P) is determined; this is instead of computing d·P. At block 406, S=d·R is subtracted to obtain d·P. In some cases, at block 408, for the next scalar multiplication operation, R and S are redefined using $R=(-1)^b 2R$ and $S=(-1)^b 2S$ respectively, where b is a random bit generated each time.

Note that for method 400, the resulting computation is equivalent to calculating d·P:

$$d\cdot(R+P)-S=d\cdot(R+P)-d\cdot R=d\cdot P.$$

For the subsequent iterations it holds that:

$$R = (1-)^b 2R,$$
$$S = (-1)^b 2S, \text{ and}$$
$$d\cdot((-1)^b 2R + P) - (-1)^b 2S = d(-1)^b 2dR - (-1)^b 2dR + dP$$
$$= d\cdot P.$$

In the embodiments described herein, an approach is provided based on randomizing a point representation. The embodiments described herein take advantage of the fact that projective representations are not unique to avoid analysis on the original points used in the ECC scheme. Thus, this approach can achieve increased efficiency compared to conventional or generic DCSA countermeasure approaches.

Figure 5:
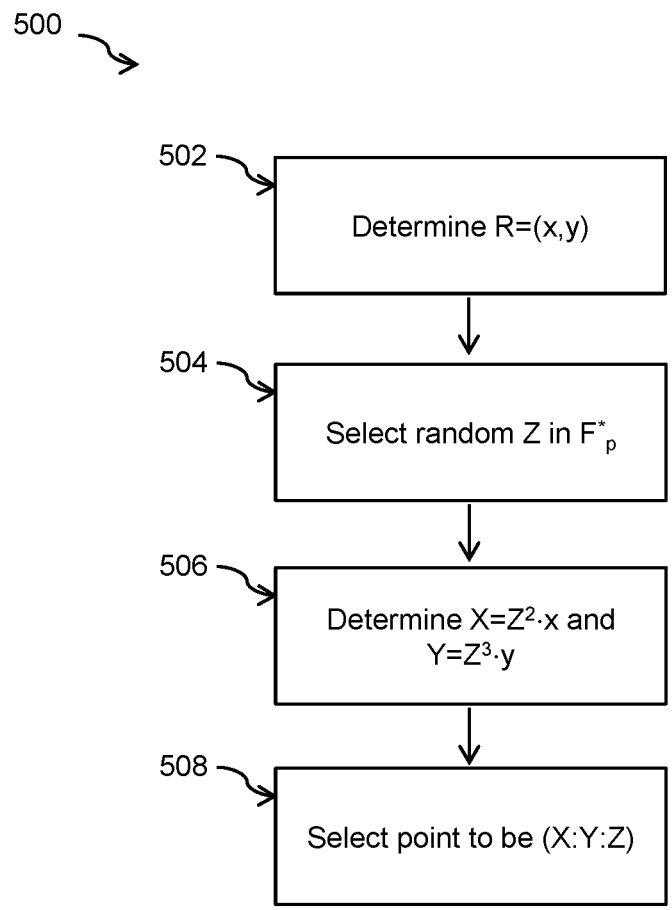
FIG. 5 is a flow chart showing a method for forming a point representation in Jacobian projective coordinates for an ECC scheme, according to an embodiment.

In an embodiment, whenever an affine point (x,y) on the elliptic curve is converted to any form of projective coordinates representation, then X=x, Y=y, and Z=1. This representation provides direct correspondence to the original point. In order to provide randomization, a random Z needs to be selected in every conversion, and the corresponding projective point needs to be determined. For the following exemplary representations, this can be accomplished as follows:

Standard projective coordinates: (Zx:Zy:Z)
Jacobian projective coordinates: $(Z^2\cdot x:Z^3\cdot y:Z)$
Chudnovsky projective coordinates: $(Z^2\cdot x:Z^3\cdot y:Z:Z^2:Z^3)$
Modified Jacobian coordinates: $(Z^2\cdot x:Z^3 y:Z:aZ^4)$ As described above, the Applicant determined that Jacobian representation can be the most efficient representation for ECC. Thus, as shown in FIG. 5, there is provided a method 500 for forming the point representation in Jacobian projective coordinates for an ECC scheme. At block 502, a point R=(x,y) is determined in affine coordinates. At block 504, a random Z in F (the field of the elliptic curve) is selected. At block 506, $X=Z^2\cdot x$ and $Y=Z^3\cdot y$ are determined. At block 508, the point is selected to be (X:Y:Z).

In most cases, every time the conversion to Jacobian projective coordinates is performed, Z can be selected to be a new random element.

With respect to elliptic curves, there exist various representations or forms. A common standard elliptic curve form used in ECC is the Weierstrass form. Another elliptic curve form is an Edwards curve; which is described below.

Edwards curves are elliptic curves defined over field F of the form:

$$x^2+y^2=1+dx^2y^2,$$

where d∈F. For practical purposes, F can be considered a finite field.

Additionally, there are also Twisted Edwards curves, which are of the form:

$$ax^2+y^2=1+dx^2y^2,$$

where a,d∈F. Again, for practical purposes, F can be considered a finite field.

Just as for Weierstrass forms, Edwards curves can have different representations. However, Edwards curves representations are not as straightforward as Weierstrass forms. As described below, a selection of Edwards curves representations can be summarized via coordinate conversions.

Edwards curves can be represented in projective homogenous representations. To convert from affine coordinates to projective homogeneous coordinates, the following can be performed:

$$(x,y)\rightarrow x:y:1$$

Conversely, to go from projective homogeneous to affine, the following can be performed:

$$(X:Y:Z)\rightarrow(X/Z,Y/Z)$$

Edwards curves can also be represented in inverted coordinate representations. Such representations are generally special to Edwards curves. To convert from affine coordinates to inverted coordinates, the following can be performed:

$$(x,y)\rightarrow(y:x:xy)$$

Conversely, to go from inverted coordinates to affine coordinates, the following can be performed:

$$(X:Y:Z)\rightarrow(Z/X,Z/Y)$$

For Edwards curves, it is also possible to convert between projective coordinates and inverted coordinates. To convert from projective coordinates to inverted coordinates, the following can be performed:

$$(X:Y:Z)\rightarrow(YZ:XZ:XY)$$

Conversely, to go from inverted coordinates to projective homogeneous coordinates, the following can be performed:

$$(X:Y:Z)\rightarrow(Z/X:Z/Y:1)$$

Edwards curves can also be represented in extended coordinate representations. Often, extended coordinate representations are referred to as extended coordinates for Twisted Edwards curves. Such representations are generally special to Edwards curves. To convert from affine coordinates to extended coordinates, the following can be performed:

$$(x,y)\rightarrow(x:y:1:xy)$$

Conversely, to go from extended coordinates to affine coordinates, the following can be performed:

$$(X:Y:Z:T)\rightarrow(X/Z,Y/Z)$$

where Z=XY/T.

For Edwards curves, it is also possible to convert between projective coordinates and extended coordinates. To convert from projective coordinates to extended coordinates, the following can be performed:

$$(X:Y:Z)\rightarrow(X:Y:Z:XY/Z)$$

Conversely, to go from extended coordinates to projective coordinates, the following can be performed:

$$(X:Y:Z:Y:Z)$$

where Z=XY/T.

While Edwards curves provide various advantages for ECC, conventionally such forms do not include efficient countermeasures. Advantageously, as described herein, there are provided efficient techniques of countermeasures against DSCA for Edwards forms of elliptic curves. In further embodiments, the countermeasure techniques described herein can be used for other non-Weierstrass forms of elliptic curves.

With respect to Weierstrass curves, conventional scalar multiplication masking approaches can reduce computational performance from approaches without DSCA countermeasures by approximately half. With the projective coordinate approach, as described herein, the computational performance is only reduced from approaches without DSCA countermeasures by about 77 percent speed using the technique of blinding in projective coordinates.

As described herein, the blinding DSCA countermeasure approach can be applied to Edwards curves to advantageously increase computational performance. However, Edwards curve coordinate representation differs significantly from that of the Weierstrass form, and therefore, required significant analysis on the application of blinding countermeasures by the Applicant. Additionally, there are different coordinate representations that were considered by the Applicant for Edwards curves; namely, homogeneous projective representations, inverted representations and extended representations. As described below, each of the exemplary coordinate representations for Edwards curves were considered separately, and an estimate of the computational cost was determined.

Figure 6:
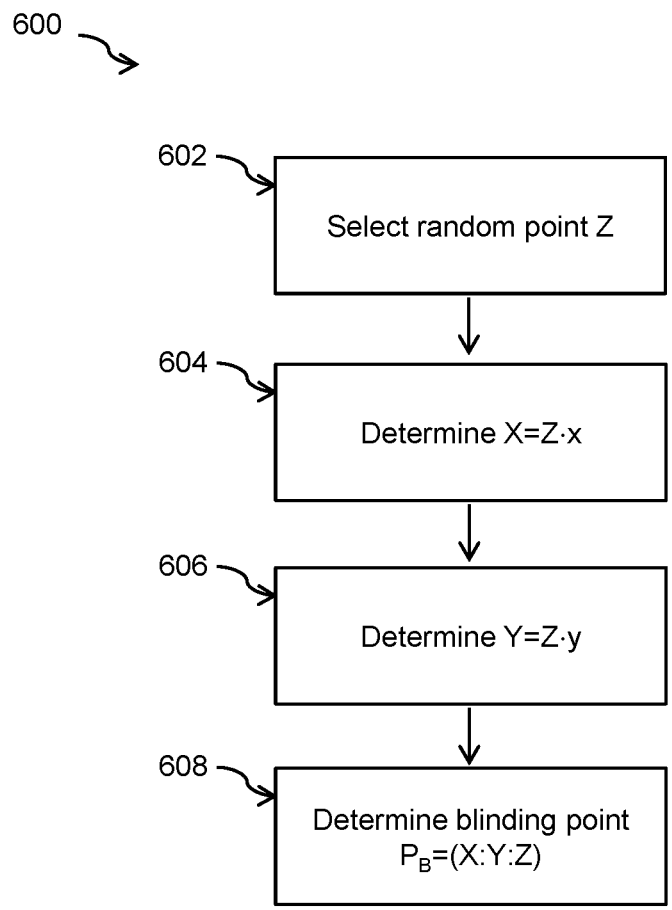
FIG. 6 is a flow chart showing a method for applying homogeneous projective blinding to an Edwards curve, according to an embodiment.

With respect to projective homogenous coordinate representations of Edwards curves, a DSCA countermeasure can be applied via projective blinding. As shown in FIG. 6, there is provided a method 600 for applying homogeneous projective blinding to an Edwards curve, given a point initially in affine coordinates represented as $P=(x,y)$. Where the Edwards curve is defined over field F. At block 602, a random element Z is selected. At block 604, X is determined to be $X=Z \cdot x$. At block 606, Y is determined to be $Y=Z \cdot y$. At block 608, blinded point $P_B$ is determined to be $P_B=(X:Y:Z)$. In some cases, the random element Z may be called random element I.

For method 600, point $P_B$ is a blinded version in projective homogeneous coordinates of the original affine point P. In most cases, every time the projective homogenous coordinate blinding is performed, Z can be selected to be a new random element. In most cases, when method 600 is applied to the same point at different instances of the cryptographic protocol, Z should be a new random field element for each instance.

The approximate cost of the approach of method 600 as a DSCA countermeasure was determined by the Applicant as analyzed with respect to the scalar multiplication operation. In this case, mixed addition cannot be utilized. Therefore, instead of using doubling and mixed addition, where the complexity of the more expensive operation is taken, the complexity of the greater of the addition and doubling operations are used. In this example, it is assumed that the SSCA countermeasure is already in place, since indistinguishable DOUBLE and ADD operations are desirable. Accordingly, doubling requires 7 field multiplications, mixed addition requires 9 field multiplications, and pure homogeneous addition requires 11 field multiplications. When performing the scalar multiplication operation, for each bit of that scalar, a DOUBLE or ADD step must be performed, depending on the value of that bit. Thus, each bit of the scalar increases the complexity by 2 field multiplications. It is assumed that the field inversion is equivalent to about 100 field multiplications. Further, assuming that it is a b-bit curve, the total number of operations required to perform scalar multiplication is 9b+200. The total increase in complexity, when using blinding, works out to 2b+2. Hence, the overall cost, using the blinding countermeasure technique of method 600 is approximately:

$$\frac{2b+2}{9b+200}.$$

In practice, b can range, for example, between 256 and 521. Hence, the approximate cost of the blinding countermeasure technique of method 600 is approximately 20 to 21 percent. In other words, when this countermeasure is applied, the performance of scalar multiplication operation runs at about 83 percent computational speed. When compared to generic blinding operations, this provides a noticeable improvement.

Figure 7:
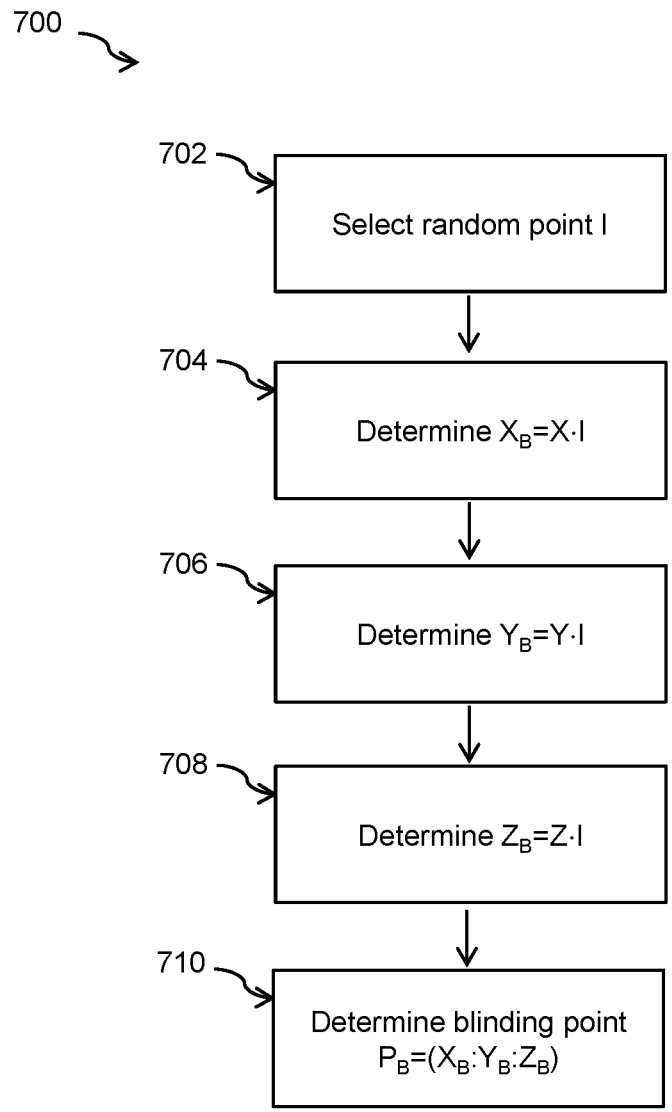
FIG. 7 is a flow chart showing a method for applying homogeneous projective blinding to an Edwards curve, according to another embodiment.

In another embodiment, in an ECC scheme, there may be a point on an Edwards curve that is already in homogeneous projective coordinates and blinding is required to be performed on such point. In that case, as shown in FIG. 7, there is provided a method 700 for applying homogeneous projective blinding to an Edwards curve, given a point initially in homogeneous projective coordinates represented as $P=(X:Y:Z)$. At block 702, a random element I is selected from the field F of the Edwards curve. At block 704, $X_B$ is determined to be $X_B=X \cdot I$. At block 706, $Y_B$ is determined to be $Y_B=Y \cdot I$. At block 708, $Z_B$ is determined to be $Z_B=Z \cdot I$. At block 710, blinded point $P_B$ is determined to be $P_B=(X_B:Y_B:Z_B)$.

In method 700, point $P_B$ is a blinded version in projective coordinates of the original projective point P. In most cases, every time the projective homogenous coordinate blinding is performed, I can be selected to be a new random element. In most cases, when method 700 is applied to the same point at different instances of the cryptographic protocol, I should be a new random field element for each instance.

In method 700, where there is no possibility of taking advantage of mixed addition, the DSCA countermeasure can be deployed at the cost of only 3 field multiplications; which is negligible with respect to overall running time.

Figure 8:
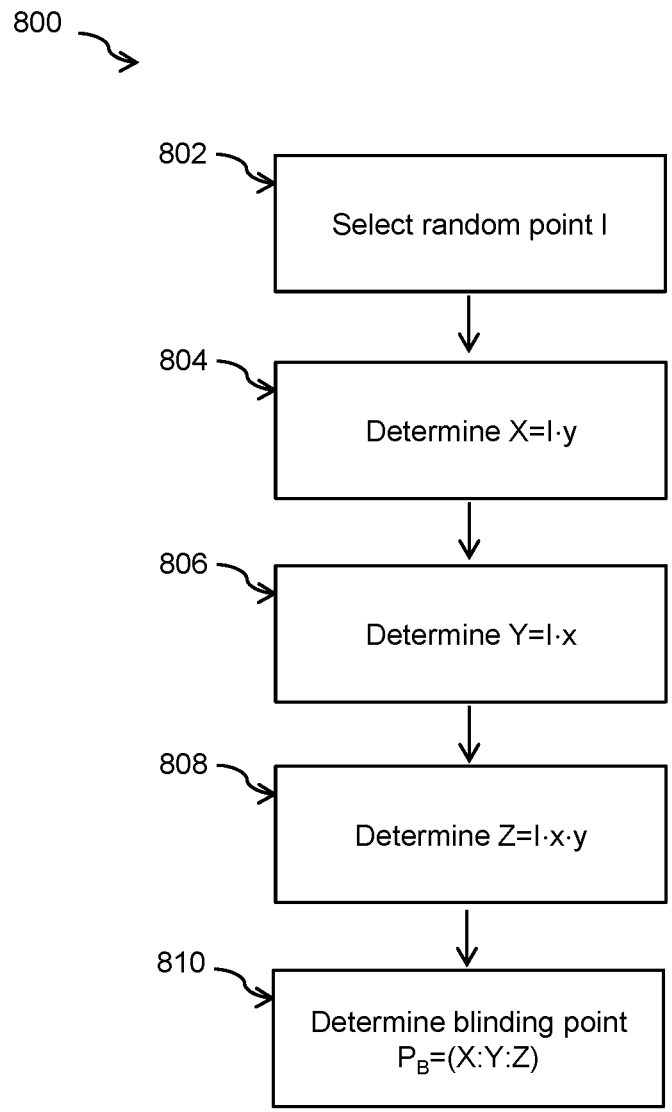
FIG. 8 is a flow chart showing a method for applying inverted coordinate blinding to an Edwards curve, according to an embodiment.

With respect to inverted coordinate representations of Edwards curves, a DSCA countermeasure can also be applied via projective blinding. As shown in FIG. 8, there is provided a method 800 for applying inverted coordinate blinding to an Edwards curve, given a point initially in affine coordinates represented as $P=(x,y)$. Where the Edwards curve is defined over field F. At block 802, a random element I is selected in the field F. At block 804, X is determined to be $X=I \cdot y$. At block 806, Y is determined to be $Y=I \cdot x$. At block 808, Z is determined to be $Z=I \cdot x \cdot y$. At block 810, blinded point $P_B$ is determined to be $P_B=(X:Y:Z)$.

For method 800, point $P_B$ is a blinded version in inverted coordinates of the original affine point P. In most cases, every time the inverted coordinate blinding is performed, I can be selected to be a new random element. In most cases, when method 800 is applied to the same point at different instances of the cryptographic protocol, I should be a new random field element for each instance.

The approximate cost of the approach of method 800 as a DSCA countermeasure was determined by the Applicant as analyzed with respect to the scalar multiplication operation. In this case, mixed addition cannot be utilized. Therefore, instead of using doubling and mixed addition, where the complexity of the more expensive operation is taken, the complexity of the greater of the addition and doubling operations are used. In this example, it is assumed that the SSCA countermeasure is already in place, since indistinguishable DOUBLE and ADD operations are desirable. Doubling requires 8 field multiplications, mixed addition requires 8 field multiplications, and addition requires 9 field multiplications. When performing the scalar multiplication operation, for each bit of that scalar, a DOUBLE or ADD operation must be performed, depending on the value of that bit. Thus, each bit of the scalar increases the complexity by 1 field multiplication. It is assumed that the field inversion is equivalent to about 100 field multiplications. Further, assuming that it is a b-bit curve, the total number of operations required to perform scalar multiplication is 8b+200. The total increase in complexity, when using blinding works out to b+3. Hence, the overall cost, using the blinding countermeasure technique of method 800 is approximately:

$$\frac{b+3}{8b+200}.$$

In practice, b can range, for example, between 256 and 521. Hence, the approximate cost of the blinding countermeasure approach of method 800 is about 11 to 12 percent. In other words, when this countermeasure is applied, the performance of the scalar multiplication operation runs at about 90 percent computational speed. When compared to generic blinding operations, this provides a noticeable improvement.

Figure 9:
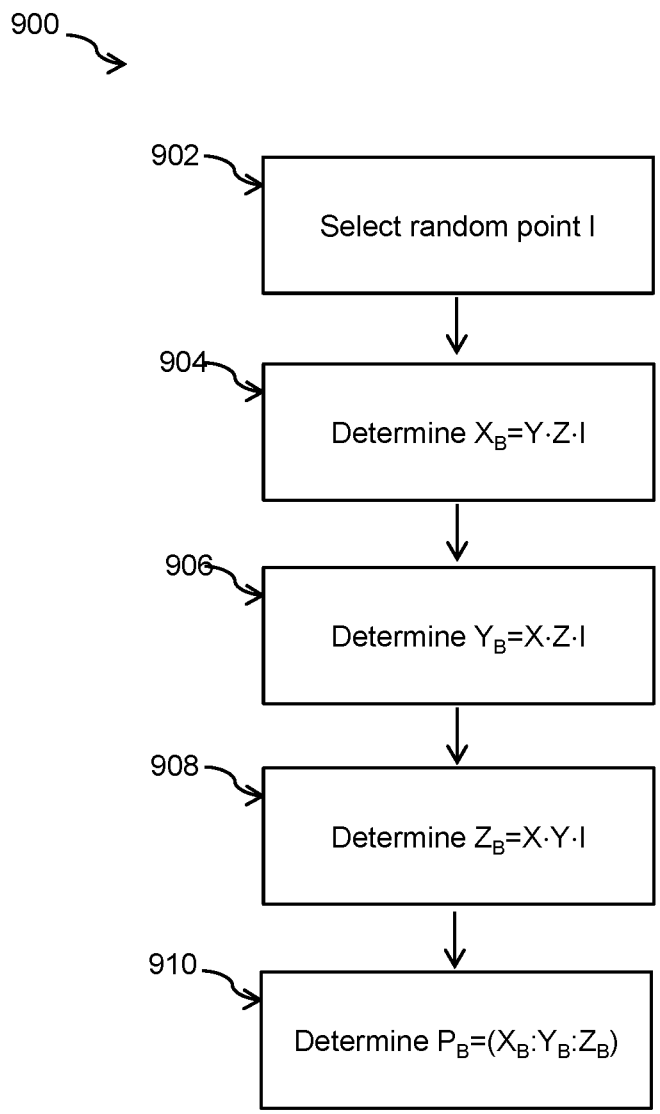
FIG. 9 is a flow chart showing a method for applying inverted coordinate blinding to an Edwards curve, according to another embodiment.

In another embodiment, in an ECC scheme, there may be a point on an Edwards curve that is already in homogeneous projective coordinates and blinding is required to be performed on such point in inverted coordinates. In that case, as shown in FIG. 9, there is provided a method 900 for applying inverted coordinate blinding to an Edwards curve, given a point initially in homogeneous projective coordinates represented as P=(X:Y:Z). At block 902, a random element I is selected from the field F of the Edwards curve. At block 904, $X_B$ is determined to be $X_B=Y \cdot Z \cdot I$. At block 906, $Y_B$ is determined to be $Y_B=X \cdot Z \cdot I$. At block 908, $Z_B$ is determined to be $Z_B=X \cdot Y \cdot I$. At block 910, blinded point $P_B$ is determined to be $P_B=(X_B:Y_B:Z_B)$.

For method 900, point $P_B$ is the blinded version in inverted coordinates of the original projective point P. In most cases, every time the inverted coordinate blinding is performed, I can be selected to be a new random element. In most cases, when method 900 is applied to the same point at different instances of the cryptographic protocol, I should be a new random field element for each instance.

Figure 10:
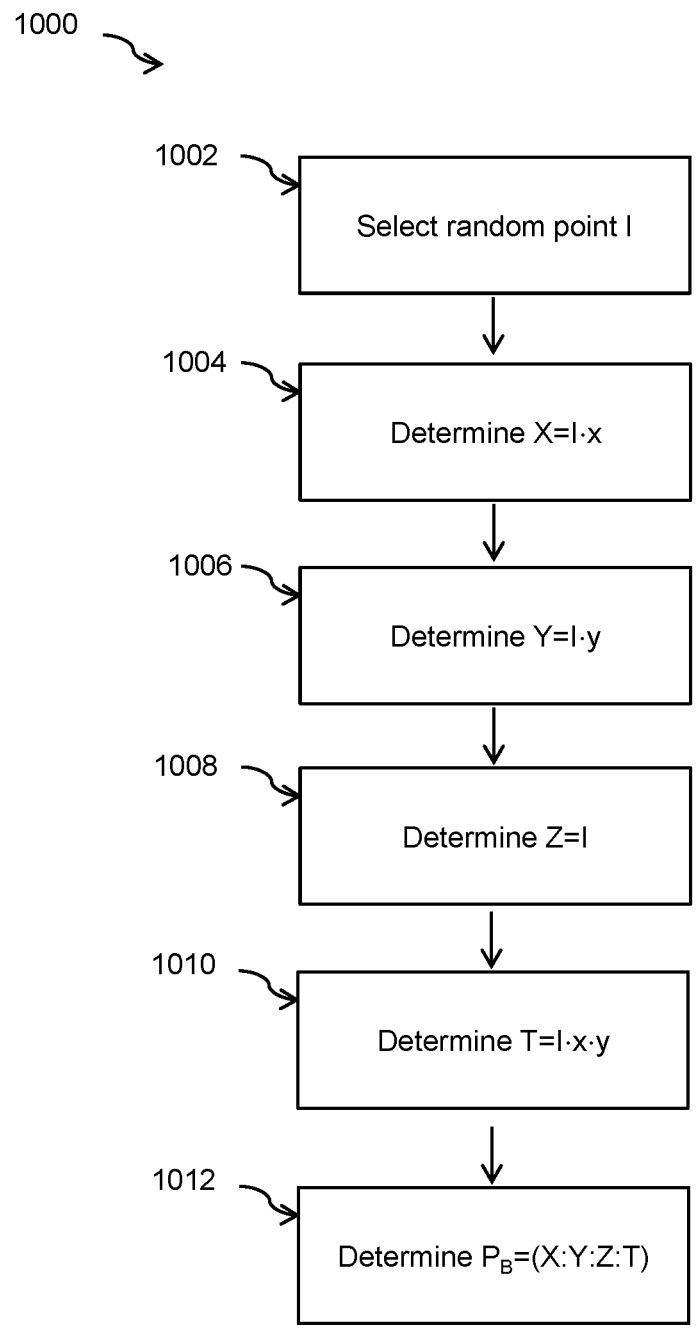
FIG. 10 is a flow chart showing a method for applying extended coordinate blinding to an Edwards curve, according to another embodiment

In method 900, where there is no possibility of taking advantage of mixed addition, the DSCA countermeasure can be deployed at the cost of only 3 field multiplications, which is negligible with respect to overall running time With respect to extended coordinate representations of Edwards curves, a DSCA countermeasure can also be applied via projective blinding. There is provided a method 1000, shown in FIG. 10, for applying extended coordinate blinding to an Edwards curve, given a point initially in affine coordinates represented as P=(x,y). Where the Edwards curve is defined over field F. At block 1002, a random element I is selected in the field F. At block 1004, X is determined to be X=I·x. At block 1006, Y is determined to be Y=I·y. At block 1008, Z is determined to be Z=I. At block 1010, $T_B$ is determined to be T=I·x·y. At block 1012, blinded point $P_B$ is determined to be $P_B$=(X:Y:Z:T).

For method 1000, point $P_B$ is the blinded version in extended coordinates of the original affine point P. In most cases, every time the extended coordinate blinding is performed, I can be selected to be a new random element. In most cases, when method 1000 is applied to the same point at different instances of the cryptographic protocol, I should be a new random field element for each instance.

The approximate cost of the approach of method 1000 as a DSCA countermeasure was determined by the Applicant as analyzed with respect to the scalar multiplication operation. In this case, mixed addition cannot be utilized. Therefore, instead of using doubling and mixed addition, where the complexity of the more expensive operation is taken, the complexity of the greater of the addition and doubling operations are used. Doubling requires 8 field multiplications, mixed addition requires 8 field multiplications, and addition requires 9 field multiplications. When performing the scalar multiplication operation, for each bit of that scalar, a DOUBLE or ADD operation must be performed, depending on the value of that bit. Thus, each bit of the scalar increases the complexity by 1 field multiplication. Thus, it is assumed that the field inversion is equivalent to about 100 field multiplications. Further, assuming that it is a b-bit curve, the total number of operations required to perform scalar multiplication is 8b+200. The total increase in complexity, when using blinding is determined to be b+3. Hence, the overall cost, using the blinding countermeasure technique of method 1000 is approximately:

$$\frac{b+3}{8b+200}.$$

In practice, b can range, for example, between 256 and 521. Hence, the approximate cost of the blinding countermeasure approach of method 1000 is about 11 to 12 percent. In other words, when this countermeasure is applied, the performance of scalar multiplications operation runs at about 90 percent speed. When compared to generic blinding operations, this provides a noticeable improvement.

Figure 11:
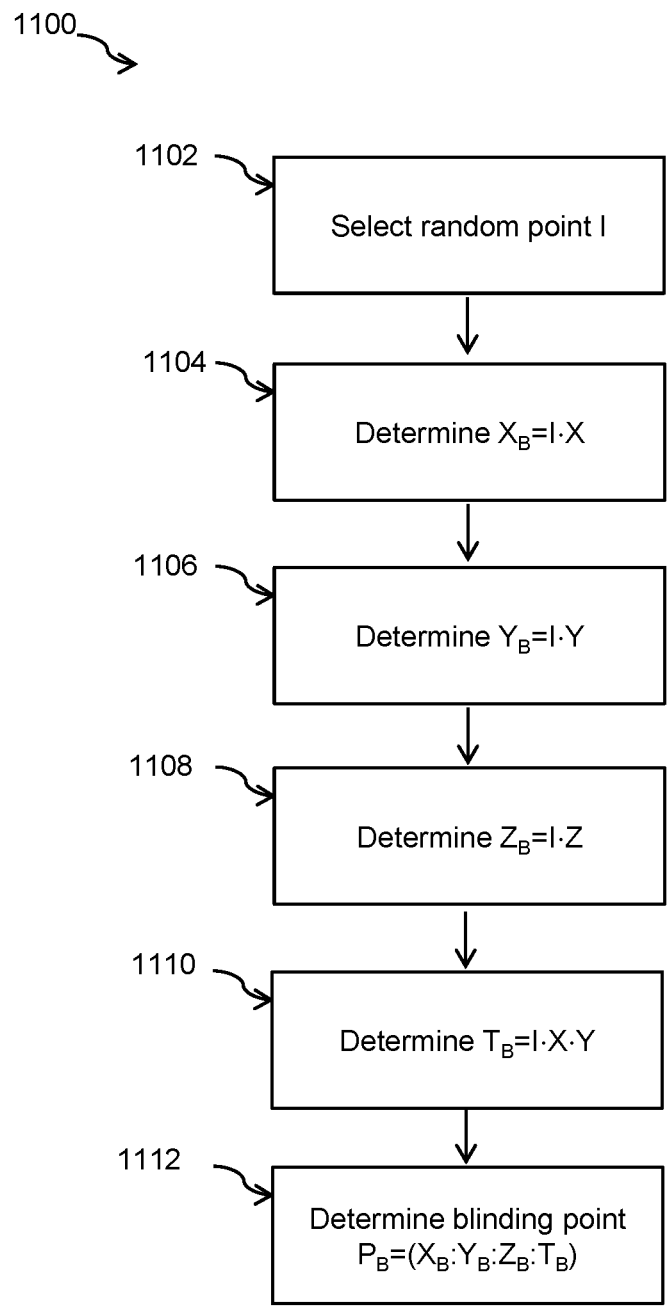
FIG. 11 is a flow chart showing a method for applying extended coordinate blinding to an Edwards curve, according to an embodiment.

In another embodiment, in an ECC scheme, there may be a point on an Edwards curve that is already in homogeneous projective coordinates and blinding is required to be performed on such point in extended coordinates. In that case, as shown in FIG. 11, there is provided a method 1100 for applying extended coordinate blinding to an Edwards curve, given a point initially in homogeneous projective coordinates represented as P=(X:Y:Z). At block 1102, a random element I is selected from the field F of the Edwards curve. At block 1104, $X_B$ is determined to be $X_B$=I·X. At block 1106, $Y_B$ is determined to be $Y_B$=I·Y. At block 1108, $Z_B$ is determined to be $Z_B$=I·Z. At block 1110, $T_B$ is determined to be $T_B$=I·X·Y. At block 1112, blinded point $P_B$ is determined to be $P_B=(X_B:Y_B:Z_B:T_B)$.

In method 1100, point $P_B$ is a blinded version in extended coordinates of the original projective point P. In most cases, every time the extended coordinate blinding is performed, I can be selected to be a new random element. In most cases, when method 1100 is applied to the same point at different instances of the cryptographic protocol, I should be a new random field element for each instance.

In method 1100, where there is no possibility of taking advantage of mixed addition, the DSCA countermeasure can be deployed at the cost of only 4 field multiplications; which is negligible with respect to overall running time.

As described herein, Applicant has developed blinding techniques for various representations of Edwards curves. With generic approaches to blinding, scalar multiplication operations typically run at about 50 percent computational speed when compared to the same operations with blinding. Applicant recognized the substantial advantages of the methods described herein for blinding of Edwards curves that run at approximately 83 to 90 percent computational speed. Accordingly, there is a definite and substantial improvement over conventional approaches.

Figure 12:
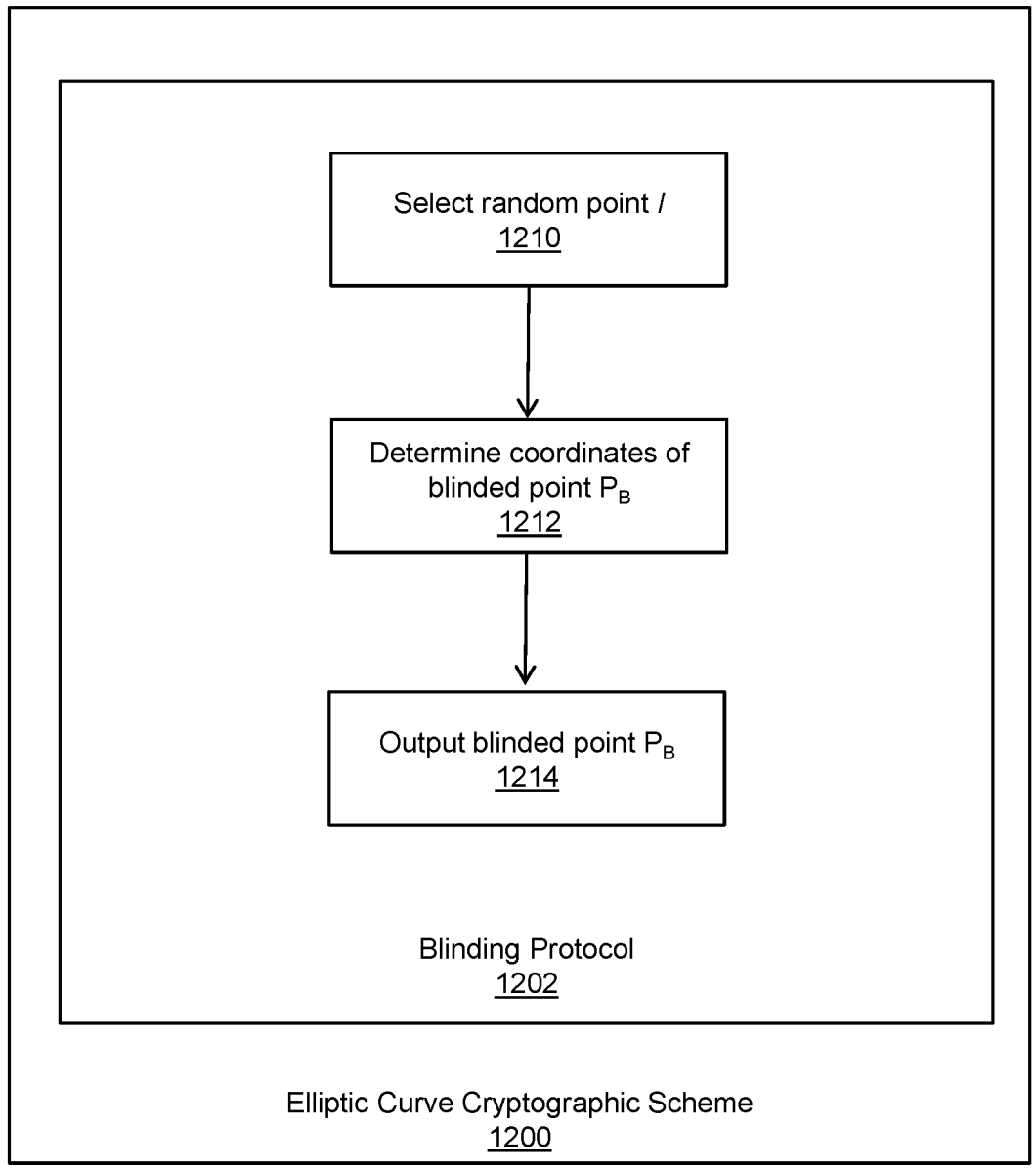
FIG. 12 is a conceptual block diagram of an elliptic curve cryptography scheme, according to an embodiment.

Turning to FIG. 12, a conceptual block diagram of an elliptic curve cryptographic ("ECC") scheme 1200, according to an embodiment, is shown. The elliptic curve cryptography scheme 400 permits secure communications between two or more cryptographic correspondent devices 12. Each of the cryptographic correspondent devices 12 includes at least a processor 26 and a memory 22. The memory 22 is configured to store a plurality of instructions which when executed by the processor 26 cause the processor 26 to implement the elliptic curve cryptography scheme 1200.

The elliptic curve of the ECC scheme 1200 is an Edwards curve. The elliptic curve is defined over field F and has a point P with coordinates located on the elliptic curve.

The ECC scheme 1200 includes a blinding protocol 1202. The blinding protocol 1202 can be used to perform a selection of the methods of the various embodiments described herein. In one case, the blinding protocol 1202 can be used to determine a blinded point $P_B$. At block 1210, a random element I is selected from the field F. At block 1212, coordinates of a blinded point $P_B$ are determined by performing a multiplication of a coordinate of random element I by at least one of the coordinates of point P for each of the coordinates of random element I. At block 1214, the coordinates of blinded point $P_B$ are provided for subsequent determinations or provided for output.

In some cases, the point P is a generator point of the elliptic curve. Also, in most cases, a new random element I is selected every time the blinding protocol is performed.

In cases where the coordinates of the Edwards curve are in a projective homogenous coordinate representation and the point P is in affine coordinates, the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I.

In further cases where the coordinates of the Edwards curve are in a projective homogenous coordinate representation and the point P is in homogenous projective coordinates, the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I multiplied by the z-coordinate of the point P.

In further cases where the coordinates of the Edwards curve are in an inverted coordinate representation and the point P is in affine coordinates, the x-coordinate of blinded point $P_B$ is determined to be the random element I multiplied by the y-coordinate of the point P, the y-coordinate of blinded point $P_B$ is determined to be the random element I multiplied by the x-coordinate of the point P, and the z-coordinate of blinded point $P_B$ is determined to be the random element I multiplied by the x-coordinate of the point P and the y-coordinate of the point P.

In further cases where the coordinates of the Edwards curve are in an inverted coordinate representation and the point P is in homogeneous projective coordinates, the x-coordinate of blinded point $P_B$ is determined to be the random element I multiplied by the y-coordinate of the point P and the z-coordinate of the point P, the y-coordinate of blinded point $P_B$ is determined to be the random element I multiplied by the x-coordinate of the point P and the z-coordinate of the point P, and the z-coordinate of blinded point $P_B$ is determined to be the random element I multiplied by the x-coordinate of the point P and the y-coordinate of the point P.

In further cases where the coordinates of the Edwards curve are in an extended coordinate representation and the point P is in affine coordinates, the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I, and the t-coordinate of blinded point $P_B$ is determined to be the random element I multiplied by the x-coordinate of the point P and the y-coordinate of the point P.

In further cases where the coordinates of the Edwards curve are in an extended coordinate representation and the point P is in homogenous projective coordinates, the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I multiplied by the x-coordinate of the point P and the y-coordinate of the point P, and the t-coordinate of blinded point $P_B$ is determined to be the random element I multiplied by the x-coordinate of the point P and the y-coordinate of the point P.

Figure 13:
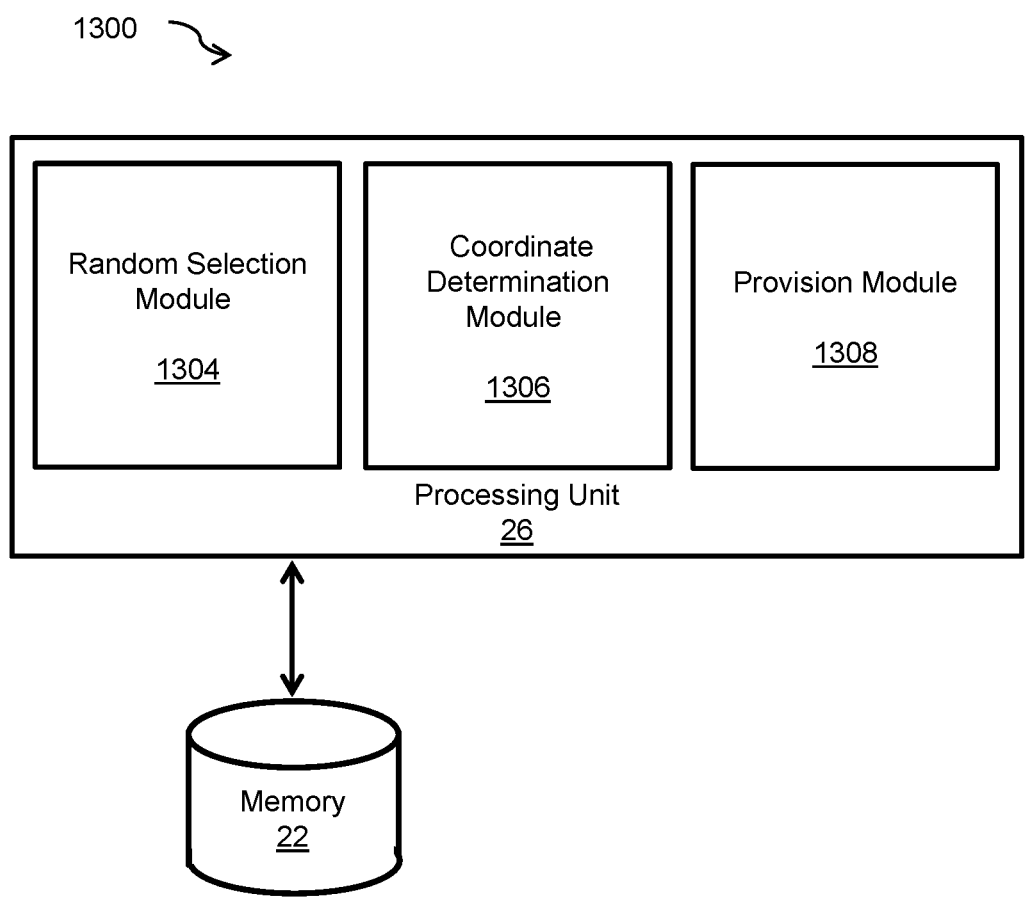
FIG. 13 is a representation of a system for implementing an elliptic curve cryptography scheme on a correspondent device, according to an embodiment.

Turning to FIG. 13, there is provided a block diagram for a system 1300 for implementing an elliptic curve cryptographic ("ECC") scheme on a correspondent device, according to an embodiment. The system 1300 implemented on the correspondent device 12 includes the processing unit 26 and memory 22. The processing unit includes a random selection module 1304, a coordinate determination module 1306, and a provision module 1308. The random selection module 1304 can select a random element I from the field F of the elliptic curve. The elliptic curve being an Edwards curve. The coordinate determination module 1306 determines coordinates of a blinded point $P_B$ by performing a multiplication of a coordinate of random element I by at least one of the coordinates of point P. In some cases, the provision module 1308 provides the coordinates of blinded point $P_B$ for further determinations in the ECC scheme. In other cases, the provision can be to other modules or correspondent devices, as the case may be.

In cases where the coordinates of the Edwards curve are in a projective homogenous coordinate representation and the point P is in affine coordinates, the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, and the z-coordinate of blinded point $P_B$ is determined by the coordinate determination module to be the random element I.

In further cases where the coordinates of the Edwards curve are in a projective homogenous coordinate representation and the point P is in homogenous projective coordinates, the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, and the z-coordinate of blinded point $P_B$ is determined by the coordinate determination module to be the random element I multiplied by the z-coordinate of the point P.

In further cases where the coordinates of the Edwards curve are in an inverted coordinate representation and the point P is in affine coordinates the x-coordinate of blinded point $P_B$ is determined by the coordinate determination module to be the random element I multiplied by the y-coordinate of the point P, the y-coordinate of blinded point $P_B$ is determined by the coordinate determination module to be the random element I multiplied by the x-coordinate of the point P, and the z-coordinate of blinded point $P_B$ is determined by the coordinate determination module to be the random element I multiplied by the x-coordinate of the point P and the y-coordinate of the point P.

In further cases where the coordinates of the Edwards curve are in an inverted coordinate representation and the point P is in homogeneous projective coordinates, the x-coordinate of blinded point $P_B$ is determined by the coordinate determination module to be the random element I multiplied by the y-coordinate of the point P and the z-coordinate of the point P, the y-coordinate of blinded point $P_B$ is determined by the coordinate determination module to be the random element I multiplied by the x-coordinate of the point P and the z-coordinate of the point P, and the z-coordinate of blinded point $P_B$ is determined by the coordinate determination module to be the random element I multiplied by the x-coordinate of the point P and the y-coordinate of the point P.

In further cases where the coordinates of the Edwards curve are in an extended coordinate representation and the point P is in affine coordinates, the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, the z-coordinate of blinded point $P_B$ is determined by the coordinate determination module to be the random element I, and the t-coordinate of blinded point $P_B$ is determined by the coordinate determination module to be the random element I multiplied by the x-coordinate of the point P and the y-coordinate of the point P.

In further cases where the coordinates of the Edwards curve are in an extended coordinate representation and the point P is in homogenous projective coordinates, the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, the z-coordinate of blinded point $P_B$ is determined by the coordinate determination module to be the random element I multiplied by the x-coordinate of the point P and the y-coordinate of the point P, and the t-coordinate of blinded point $P_B$ is determined by the coordinate determination module to be the random element I multiplied by the x-coordinate of the point P and the y-coordinate of the point P.

Advantageously, the embodiments described herein making use of blinding techniques for Edwards curves in ECC such that DSCA countermeasures can be provided efficiently and at low computational cost.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

We claim:

1. An elliptic curve cryptography scheme using an Edwards-form elliptic curve, the elliptic curve cryptography scheme comprising a blinding protocol resistant to differential side channel attacks, the elliptic curve cryptography scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the elliptic curve defined over field F and having a point P with coordinates located on the elliptic curve, the blinding protocol comprising:

randomly selecting a random element I;

determining coordinates of a blinded point $P_B$ by by determining the x-coordinate of blinded point $P_B$ as the random element I multiplied by the x-coordinate or the y-coordinate of the point P, the y-coordinate of blinded point $P_B$ as the random element I multiplied by the x-coordinate or the y-coordinate of the point P, and the z-coordinate of blinded point $P_B$ as the random element I, the random element I multiplied by the z-coordinate of the point P, or the random element I multiplied by the x-coordinate of the point P and the y-coordinate of the point P; and providing coordinates of blinded point $P_B$.

2. The elliptic curve cryptography scheme of claim 1, wherein the point P is a generator point of the elliptic curve.

3. The elliptic curve cryptography scheme of claim 1, wherein a new random element I is selected every time the blinding protocol is performed.

4. The elliptic curve cryptography scheme of claim 1, wherein the point P is in affine coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I.

5. The elliptic curve cryptography scheme of claim 1, wherein the point P is in homogenous projective coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I multiplied by the z-coordinate of the point P.

6. The elliptic curve cryptography scheme of claim 1, wherein the point P is in affine coordinates, and wherein the x-coordinate of blinded point $P_B$ is determined to be the random element I multiplied by the y-coordinate of the point P, the y-coordinate of blinded point $P_B$ is determined to be the random element I multiplied by the x-coordinate of the point P, and the z-coordinate of blinded point $P_B$ is determined to be the random element I multiplied by the x-coordinate of the point P and the y-coordinate of the point P.

7. The elliptic curve cryptography scheme of claim 1, wherein the point P is in homogenous projective coordinates, and wherein the x-coordinate of blinded point $P_B$ is determined to be the random element I multiplied by the y-coordinate of the point P and the z-coordinate of the point P, the y-coordinate of blinded point $P_B$ is determined to be the random element I multiplied by the x-coordinate of the point P and the z-coordinate of the point P, and the z-coordinate of blinded point $P_B$ is determined to be the random element I multiplied by the x-coordinate of the point P and the y-coordinate of the point P.

8. The elliptic curve cryptography scheme of claim 1, wherein the point P is in affine coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I, and the t-coordinate of blinded point $P_B$ is determined to be the random element I multiplied by the x-coordinate of the point P and the y-coordinate of the point P.

9. The elliptic curve cryptography scheme of claim 1, wherein the point P is in homogenous projective coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I multiplied by the x-coordinate of the point P and the y-coordinate of the point P, and the t-coordinate of blinded point $P_B$ is determined to be the random element I multiplied by the x-coordinate of the point P and the y-coordinate of the point P.

10. A method for applying a differential side-channel attack countermeasure in elliptic curve cryptography using an Edwards-form elliptic curve, to permit secure communications between two or more cryptographic correspondent devices, each of the cryptographic correspondent devices comprising a processor and a memory, the memory configured to store a plurality of instructions which when executed by the processor cause the processor to implement the method, the elliptic curve defined over field F and having a point P with coordinates located on the elliptic curve, the method comprising:
   randomly selecting a random element I; and
   determining coordinates of a blinded point $P_B$ by determining the x-coordinate of blinded point $P_B$ as the random element I multiplied by the x-coordinate or the y-coordinate of the point P, the y-coordinate of blinded point $P_B$ as the random element I multiplied by the x-coordinate or the y-coordinate of the point P, and the z-coordinate of blinded point $P_B$ as the random element I, the random element I multiplied by the z-coordinate of the point P, or the random element I multiplied by the x-coordinate of the point P and the y-coordinate of the point P.

11. The method of claim 10, wherein the point P is in affine coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I.

12. The method of claim 10, wherein the point P is in homogenous projective coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, and the z-coordinate of blinded point $P_B$ is determined to be the random element I multiplied by the z-coordinate of the point P.

13. The method of claim 10, wherein the point P is in affine coordinates, and wherein the x-coordinate of blinded point $P_B$ is determined to be the random element I multiplied by the y-coordinate of the point P, the y-coordinate of blinded point $P_B$ is determined to be the random element I multiplied by the x-coordinate of the point P, and the z-coordinate of blinded point $P_B$ is determined to be the random element I multiplied by the x-coordinate of the point P and the y-coordinate of the point P.

14. The method of claim 10, wherein the point P is in homogenous projective coordinates, and wherein the x-coordinate of blinded point $P_B$ is determined to be the random element I multiplied by the y-coordinate of the point P and the z-coordinate of the point P, the y-coordinate of blinded point $P_B$ is determined to be the random element I multiplied by the x-coordinate of the point P and the z-coordinate of the point P, and the z-coordinate of blinded point $P_B$ is determined to be the random element I multiplied by the x-coordinate of the point P and the y-coordinate of the point P.

15. The method of claim 10, wherein the point P is in affine coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I, and the t-coordinate of blinded point $P_B$ is determined to be the random element I multiplied by the x-coordinate of the point P and the y-coordinate of the point P.

16. The method of claim 10, wherein the point P is in homogenous projective coordinates, and wherein the x-coordinate of blinded point $P_B$ is determined to be the random element I multiplied by the x-coordinate of the point P, the y-coordinate of blinded point $P_B$ is determined to be the random element I multiplied by the y-coordinate of the point P, the z-coordinate of blinded point $P_B$ is determined to be the random element I multiplied by the x-coordinate of the point P and the y-coordinate of the point P, and the t-coordinate of blinded point $P_B$ is determined to be the random element I multiplied by the x-coordinate of the point P and the y-coordinate of the point P.

17. A system for implementing an elliptic curve cryptography scheme using an Edwards-form elliptic curve, on a correspondent device, the elliptic curve cryptography scheme having a blinding protocol resistant to differential side channel attacks, the correspondent device in secure communication with one or more other correspondent devices, the correspondent device comprising a processor and a memory, the memory configured to store a plurality of instructions which when executed by the processor cause the processor to implement the elliptic curve cryptography scheme, the elliptic curve defined over field F and having a point P with coordinates located on the elliptic curve, the system comprising:
   a random selection module for randomly selecting a random element I; and
   a coordinate determination module for determining coordinates of a blinded point $P_B$ by determining the x-coordinate of blinded point $P_B$ as the random element I multiplied by the x-coordinate or the y-coordinate of the point P, the y-coordinate of blinded point $P_B$ as the random element I multiplied by the x-coordinate or the y-coordinate of the point P, and the z-coordinate of blinded point $P_B$ as the random element I, the random element I multiplied by the z-coordinate of the point P, or the random element I multiplied by the x-coordinate of the point P and the y-coordinate of the point P.

18. The system of claim 17, wherein the point P is in affine coordinates, and wherein the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, and the z-coordinate of blinded point $P_B$ is determined by the coordinate determination module to be the random element I.

19. The system of claim 17, wherein the point P is in homogenous projective coordinates, and wherein the x-coordinate of blinded point $P_B$ is determined by the coordinate determination module to be the random element I multiplied by the x-coordinate of the point P, the y-coordinate of blinded point $P_B$ is determined by the coordinate determination module to be the random element I multiplied by the y-coordinate of the point P, and the z-coordinate of blinded point $P_B$ is determined by the coordinate determination module to be the random element I multiplied by the z-coordinate of the point P.

20. The system of claim 17, wherein the point P is in affine coordinates, and wherein the x-coordinate of blinded point $P_B$ is determined by the coordinate determination module to be the random element I multiplied by the y-coordinate of the point P, the y-coordinate of blinded point $P_B$ is determined by the coordinate determination module to be the random element I multiplied by the x-coordinate of the point P, and the z-coordinate of blinded point $P_B$ is determined by the coordinate determination module to be the random element I multiplied by the x-coordinate of the point P and the y-coordinate of the point P.

* * * * *